United States Patent

Masuda et al.

[11] 4,217,779
[45] Aug. 19, 1980

[54] LIQUID LEVEL SENSING MEANS

[75] Inventors: Noboru Masuda, Tokyo; Mitsuyuki Suzuki, Okazaki, both of Japan

[73] Assignees: Denki Onkyo Co., Ltd., Tokyo; Aisin Seiki Kabushiki Kaisha, Kariya, both of Japan

[21] Appl. No.: 19,573

[22] Filed: Mar. 12, 1979

[30] Foreign Application Priority Data

Mar. 13, 1978 [JP] Japan .................. 53/28466

[51] Int. Cl.³ .................. G08B 5/36; G08B 19/02
[52] U.S. Cl. .................. 73/313; 340/59; 340/624
[58] Field of Search .................. 340/618, 623, 624, 59; 73/308, 313; 307/309

[56] References Cited

U.S. PATENT DOCUMENTS

| | | | |
|---|---|---|---|
| 2,383,758 | 8/1945 | Ziebolz | 73/313 |
| 3,195,043 | 7/1965 | Burig | 307/309 |
| 3,596,114 | 7/1971 | Maupin | 307/309 |
| 3,678,490 | 7/1972 | Putt | 340/59 |
| 3,845,657 | 11/1974 | Hall | 340/525 |
| 3,896,281 | 7/1975 | Feoktistov | 73/308 |
| 4,006,402 | 2/1977 | Mincuzzi | 338/32 R |
| 4,125,821 | 11/1978 | Masuda | 338/32 R |

FOREIGN PATENT DOCUMENTS 1416940 12/1975 United Kingdom .
1467574 3/1977 United Kingdom .
1507692 4/1978 United Kingdom .

*Primary Examiner*—Gerald Goldberg
*Assistant Examiner*—Denis E. Corr
*Attorney, Agent, or Firm*—Finnegan, Henderson, Farabow, Garrett & Dunner

[57] ABSTRACT

Liquid level sensing device comprising magnet received in the cylindrical portion of an oil reservoir cap, a signal generating electrical circuit, by which an oil level is indicated, including galvano-magneto effect transducing device attached to the magnet, magnetic device carried on a diaphragm of the oil reservoir and movable with respect to the transducing device, the magnetic device moving away from the transducing device when the diaphragm is lowered so that an electric signal is generated by the transducing device.

6 Claims, 8 Drawing Figures

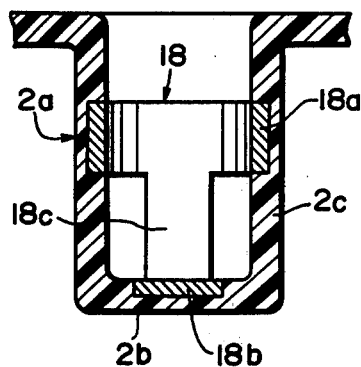
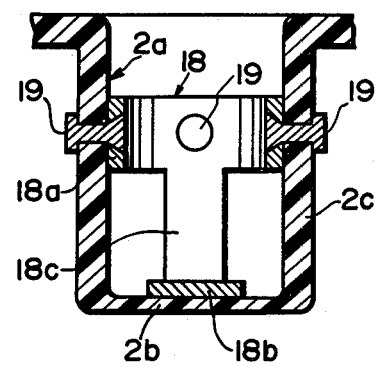
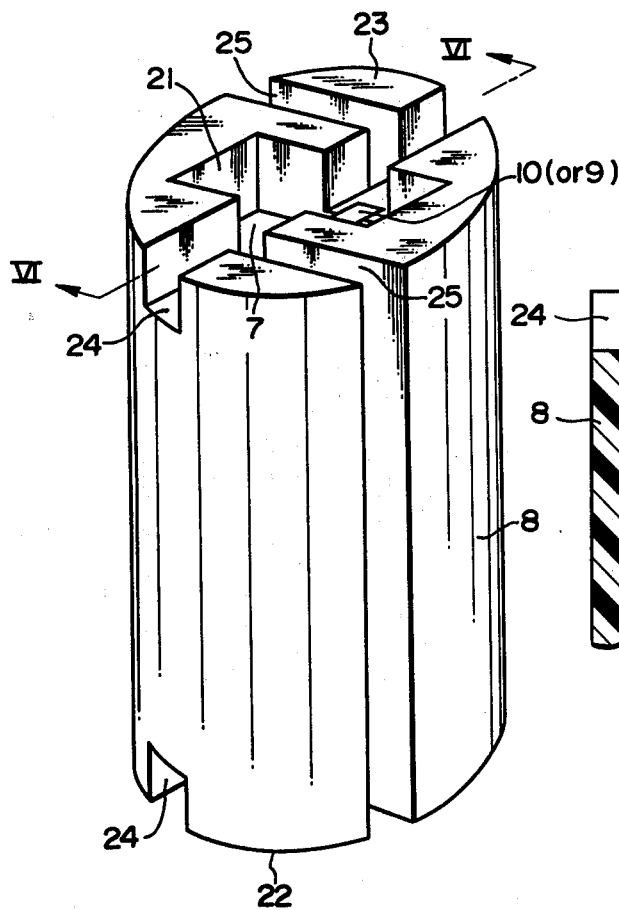
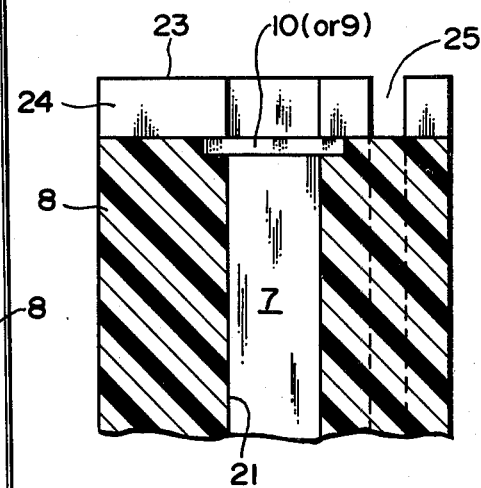

LIQUID LEVEL SENSING MEANS

The present invention relates to liquid level sensing means for detecting the level of liquid such as vehicle brake fluid or power transmission gear lubricating oil.

Conventionally, vehicles such as automobiles are equipped with oil level sensing means which provide an indication of the level of brake fluid or lubricant oil. In the case of the conventional sensing means, problems have been encountered in that a warning device to indicate lack of oil is often actuated, for example, when the sensing means is subjected to vibrations or a large amount of the brake fluid is supplied to the wheel brake means for urgent use thereof during operation of the vehicles.

It is therefore an object of the present invention to provide liquid level sensing means which provide reliable indications of the fluid level even when it is subjected to vibrations or a large amount of fluid from the reservoir is supplied to a co-operating means.

Another object of the present invention is to provide liquid level sensing means having galvano-magneto effect transducing means and magnetic means which are positioned opposite to the transducing means even during movement of the magnetic means.

According to the present invention, in order to accomplish the above and other objects, there is provided liquid level sensing means comprising magnet means housed in the hollow portion of a reservoir cap, galvano-magneto effect transducing means attached to said magnet means and constituting a signal generating electrical circuit, magnetic means carried on a diaphragm of the reservoir and movable with respect to said transducing means, the magnetic means being positioned in opposed relationship with said transducing means even during movement of said magnetic means and influencing the density of magnetic flux applied from said magnet means to a part of said transducing means so that an electrical signal is generated from said transducing means when the magnetic means is lowered in accordance with a change in liquid level in the reservoir.

The invention is hereinafter illustrated, by way of example only, with reference to the accompanying drawings, of which;

FIG. 3 is a sectional view showing another embodiment of the magnetic member;

FIG. 4 is a sectional view showing still another embodiment of the magnetic member;

FIG. 5 is a perspective view of the magnet holder;

FIG. 6 is a fragmentary section taken along the line VI—VI;

Figure 1:
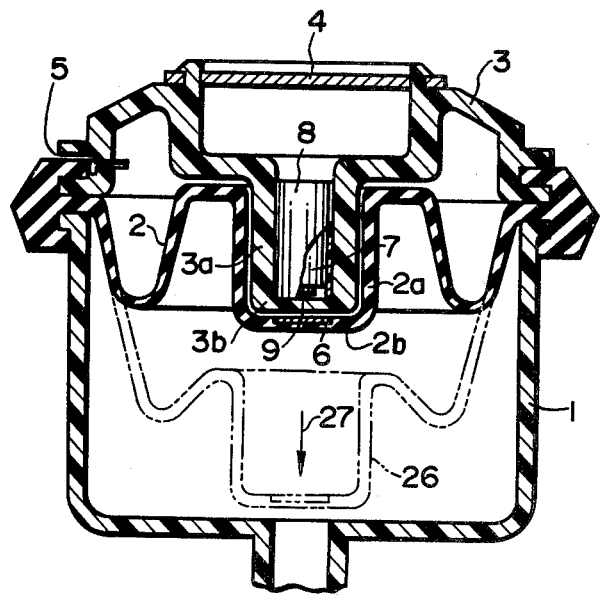
FIG. 1 is a sectional view of a liquid level sensing means in accordance with one embodiment of the present invention.

Referring to FIG. 1, the oil level sensing means shown therein includes an oil reservoir 1 which is substantially of a cylindrical configuration. At the top of the reservoir 1, there is provided a diaphragm 2 made of rubber or plastic which is secured to the reservoir 1 by a plastic cap 3 and serves to separate the interior of the reservoir 1 from the atmosphere. As illustrated in FIG. 1, the cap 3 has a cylindrical portion 3a which protrudes from the center portion thereof toward the interior of the reservoir 1. The cap 3 carries a printed circuit board 4 including a signal generating circuit and waveform shaping and temperature compensating functions. A vent hole 5 is provided between the diaphragm 2 and the cap 3 so that atmospheric pressure is introduced into the space between the diaphragm 2 and the cap 3, thereby allowing a free movement of the diaphragm 2 in accordance with the change in the pressure in the reservoir 1. The size of the vent hole may be determined in view of the property of the diaphragm 2.

The diaphragm 2 is formed at the center with a cylindrical portion 2a in which the cylindrical portion 3a of the cap 3 is loosely inserted without any interference therewith. In the cylindrical portion 2a of the diaphragm 2, there is mounted a magnetic member 6 made of a ferro-magnetic material such as iron, nickel or Permalloy (Trade Mark of Western Electric). The magnetic member 6 consists of circular plate which is inserted in a recess of the bottom portion 2b of the cylindrical portion 2a or adhesively attached to the bottom surface 2b thereof. The magnetic member may be embedded in the bottom portion 2b. Also, as shown in FIGS. 3 and 4, an integrally formed magnetic member 18 may comprise an upper annular portion 18a, a base portion 18b and connecting portion 18c which couples the annular portion 18a and the base portion 18b. The annular portion 18a may be fitted into a corresponding recess in the cylindrical wall portion 2a of the diaphragm 2 and the base portion 18b into a corresponding recess in the bottom wall portion 2b of the diaphragm cylindrical portion 2a. Further, the annular portion 18a of the magnetic member 6 may be secured to the cylindrical wall portion 2a by means of rivets 19.

Figure 2:
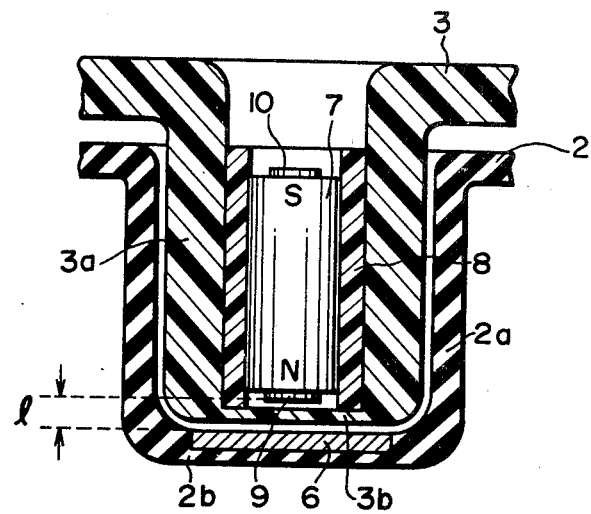
FIG. 2 is an enlarged sectional view of a part of the embodiment of the present invention.

Referring to FIG. 2, it will be seen that a magnet 7 is encircled by a magnet holder 8 made of a non-magnetic material and galvano-magneto transducer such as magneto-resistive elements 9, 10 are adhesively attached to the magnetic pole faces (N and S) thereof, respectively. The magnet 7 is mounted in the cylindrical portion 3a of the cap 3 so that one of the magnetic pole faces thereof is opposed to the magnetic member 6 through the bottom portion 3b of the cap 3 and is in alignment with movement thereof. It is preferred that the bottom portion 3b of the cap 3 has a thinner wall than that of the cylindrical portion 3a thereof and the magnet 7 is in a stationary position where the magnetic pole face thereof is as close to the inner surface of the bottom portion 3b as possible, thereby making the distance (l) between the magnetic member 6 and the magneto-resistive element 9 smaller.

When the magnetic member 6 and the element 9 are situated to a position as shown in FIG. 2, the flux density of the magnetic flux which is applied to the element 9 becomes highest.

The hollow portion of the cap 3 may be filled with an electrical insulating resin member.

Since the magneto-resistive element 9, which is adhesively attached to the magnetic pole face of the magnet 7, is actuated to be biased magnetically and the operating point of the element 9 is selected from the range where the high magneto resistance effect thereof is obtained, the high output voltage can be produced in accordance with a slight change in the magnetic flux density. Also, the other magneto-resistive element 10 is not usually subjected to the influence of the change in the magnetic flux density during the movement of the magnetic member 6 and is utilized as the temperature compensating element for the element 9. The magneto-resistive elements 9, 10 are selected in such a way that the temperature coefficients thereof, which vary according to the magnetic flux density, become equal.

One example of the holder 8 is perspectively illustrated in FIGS. 5 and 6 which is of a cylindrical configuration. The holder 8 has a center bore 21 which extends from a bottom surface 22 to a top surface 23 thereof and into which the magnet 7 is fixedly inserted. The holder 8 is provided at its bottom and top surfaces 22, 23 with grooves 24, respectively, and at its outer surface with slits 25, which extend between the bottom and top surfaces 22, 23 and which are made in opposed relationship with each other. The magneto-resistive elements 9, 10 are housed in the grooves 24, respectively and lead wires thereof are passed through the slits 25 to the circuit board 4. It is noted that the magnetoresistive element 9 is not projected over the surface 22 or 23 outside so as to be in non-contact with the bottom portion 3b of the cap for protection thereof when installed.

Figure 7:
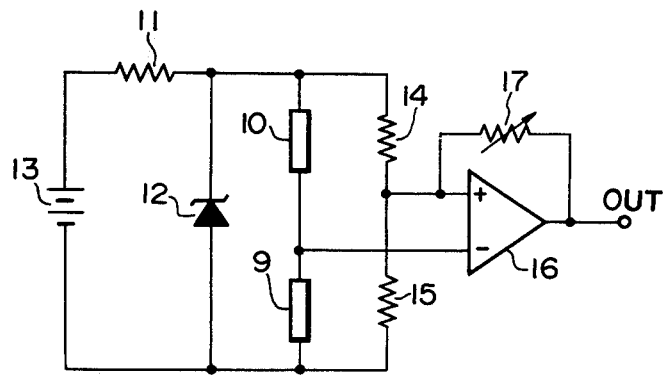
FIG. 7 is a diagram showing an example of a signal generating circuit.

Referring to FIG. 7, it will be seen that a resistor 11 and a Zener diode 12 are connected in series to terminals of a direct power supply 13 and a bridge circuit is connected to terminals of the Zener diode 12. It will be understood from FIG. 7 that the bridge circuit is constituted by the magneto-resistive elements 9, 10 and resistors 14, 15. The negative input terminal of an operational amplifier 16 is electrically connected between the magneto-resistive elements 9 and 10 and the positive terminal thereof between the resistors 14 and 15. A feed-back resistor 17 is connected between an output terminal of the amplifier 16 and the positive input terminal thereof and constitute a Schimitt trigger circuit to provide a hysteresis characteristic thereto.

Since the inside of the oil reservoir 1 is separated from the atmosphere by the diaphragm 2 and the cap 3 is opened to the atmosphere through the vent hole 5, the pressure in the reservoir 1 will change in accordance with a change in the level of oil in the reservoir 1 and the diaphragm 2 will move smoothly accordingly. For example, as the oil level decreases, the diaphragm 2 is moved downwards as shown by phantom lines 26 in FIG. 1. Thus, the magnetic member 6 is moved downwards together with the cylindrical portion 2a of the diaphragm 2.

When the reservoir 1 is filled with oil, the diaphragm 2 is in the position shown by solid lines in FIG. 1. In this case, the magnetic member 6 is in the position nearest to the magneto-resistive element 9 and the resistance value of the element 9 is high. On the other hand, the density of the magnetic flux across the element 10 is in no way changed. Thus, the electrical signal to indicate "MAX LEVEL" is generated in the output terminal of the electrical circuit shown in FIG. 7.

Figure 8:
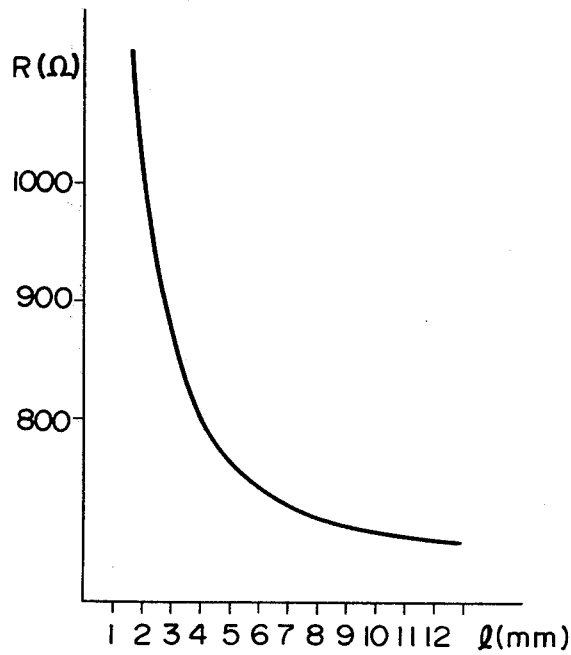
FIG. 8 is a graph explaining the relation of the distance between the magnetic member and the magneto-resistive element and the resistance value thereof.

As the oil in the reservoir 1 decreases, the diaphragm 2 having the magnetic member 6 is lowered toward an arrow 27 (see FIG. 1) in such a manner that the magnetic member 6 is gradually moved away from the magneto-resistive element 9. Accordingly, the magnetic flux passing through the magneto-resistive element 9 decrease and the resistance value thereof becomes smaller, for example, as shown in FIG. 8. Thus, when the magnetic member 6 is moved downwards over the predetermined distance from the magnetic pole face of the magnet 7, the electrical circuit shown in FIG. 7 is actuated and provides a signal to indicate the decrease in the oil. Even when the oil in the reservoir 1 is rapidly consumed and the reservoir is fully emptied, the electrical circuit is reliably actuated.

The output of the operational amplifier 16 is fed back to the positive input terminal thereof through the feed-back resistor 17. Thus, as the operative amplifier 16 has a hysteresis characteristic, repeated on-and-off switching operations are not produced even if a fluctuation of the oil level due to vibrations occurs. The variable resistance 17 may be used to regulate the hysteresis of the operative amplifier 16.

The invention has thus been shown and described with reference to specific embodiment, however, it should be noted that the invention is in no way limited to the details of the illustrated arrangements but changes and modifications may be made without departing from the scope of the appended claims.

We claim:

1. A liquid level sensing means in a liquid reservoir, said reservoir having a container base with an open top, a cap for closing said base, said cap having means permitting communication between said reservoir and the atmosphere, and a flexible diaphragm sealingly disposed between said cap and said base separating liquid in said reservoir from the atmosphere, said diaphragm moving responsive to the level of said liquid, said sensing means comprising:
   a. a cylindrically-shaped extension integrally depending from said cap into a cylindrically-shaped cup formed in said diaphragm proximate its center, said extension and said cup having complementary dimensions;
   b. first magnet means disposed within said cylindrical extension with the opposed poles of said first magnet means oriented on a line corresponding to the direction of movement of said diaphram;
   c. galvano-magneto effect transducing means constituting a signal-generating electric circuit, said transducing means comprising a magneto-resistive element attached to each opposed magnetic pole face of said first magnet means;
   d. second magnet means carried by said diaphragm proximate its center and moveable with respect to said transducing means, said second magnet means being positioned in opposed relationship with said magneto-resistive element proximate said diaphragm even during movement of said diaphragm and influencing the magnetic flux density applied to said magneto-resistive element proximate said diaphragm for generating and electrical signal in said circuit when said second magnet means is lowered in accordance with change in the liquid level of fluid in said reservoir; and
   e. said magneto-resistive element remote from said second magnet means being subjected to a substantial constant level of magnetic flux density.

2. The sensing means as in claim 1 wherein said first magnet means includes a cylindrical magnet holder made of non-magnetic material and a magnet housed therein having attached to each opposed magnetic pole thereof one of said magneto-resistive elements, said holder being disposed in said cylindrical extension and having at each opposed end thereof an opening exposing said magneto-resistive elements.

3. Sensing means in accordance with preceding claim 1 or 2, in which said second magnet means comprises a member made of a magnetic material.

4. Sensing means in accordance with claim 1 or 2, in which the magneto-resistive element remote from said second magnet means is to be used as a temperature compensating element.

5. Sensing means in accordance with claim 1, in which said electrical circuit further includes an operative amplifier and a feedback resistor therefor.

6. Sensing means in accordance with claim 2, in which said holder is constructed to prevent the magneto-resistive element proximate said second magnet means from being in direct contact with the bottom of the cylindrical extension while permitting close proximity of said second magnet means with said magneto-resistive element when said reservoir is filled with fluid.

* * * * *